(12) United States Patent
Liu et al.

(10) Patent No.: US 9,529,469 B2
(45) Date of Patent: Dec. 27, 2016

(54) TOUCH SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN); Weijie Zhao, Beijing (CN); Liguang Deng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 75 days.

(21) Appl. No.: 14/537,220

(22) Filed: Nov. 10, 2014

(65) Prior Publication Data
US 2015/0378390 A1 Dec. 31, 2015

(30) Foreign Application Priority Data

Jun. 25, 2014 (CN) .......................... 2014 1 0291219

(51) Int. Cl.
*G06F 3/044* (2006.01)
*G06F 3/041* (2006.01)
(52) U.S. Cl.
CPC ............. *G06F 3/0412* (2013.01); *G06F 3/044* (2013.01); *G06F 3/0416* (2013.01); *G06F 2203/04111* (2013.01)

(58) Field of Classification Search
CPC ....... G06F 3/044; G06F 3/0412; G06F 3/0416
USPC ............................................ 345/173; 349/38
See application file for complete search history.

(56) References Cited

U.S. PATENT DOCUMENTS

| | | | |
|---|---|---|---|
| 2002/0158826 A1* | 10/2002 | Hirota | G02F 1/134363 345/87 |
| 2009/0096946 A1* | 4/2009 | Harada | G02F 1/134363 349/38 |
| 2011/0057188 A1* | 3/2011 | Yamazaki | H01L 27/1225 257/43 |
| 2011/0193799 A1* | 8/2011 | Jun | H01L 27/323 345/173 |

(Continued)

*Primary Examiner* — Towfiq Elahi
(74) *Attorney, Agent, or Firm* — Nath, Goldberg & Meyer; Joshua B. Goldberg

(57) ABSTRACT

A touch substrate and a display device are provided. The touch substrate comprises: a base; an insulation layer, a common electrode layer, and a common electrode signal line and a plurality of touch drive electrode signal lines in the same layer, the common electrode layer comprises a plurality of touch drive electrodes, a plurality of common electrodes and a common electrode connection strip, each of the touch drive electrodes comprises a plurality of touch drive sub-electrodes, the common electrode connection strip is connected with the common electrode signal line through a plurality of first via-holes, each of the touch drive sub-electrodes is connected with one of the touch drive electrode signal lines through a second via-hole, semi-holes are provided at positions of the insulation layer corresponding to positions of the common electrodes and/or the touch drive sub-electrodes.

20 Claims, 3 Drawing Sheets

(56) References Cited

U.S. PATENT DOCUMENTS

2015/0103265 A1\* 4/2015 Kim ..................... G06F 3/0412
  349/12

\* cited by examiner

TOUCH SUBSTRATE AND DISPLAY DEVICE

TECHNICAL FIELD

The present invention relates to the field of display technology, and more particularly relates to a touch substrate and a display device.

BACKGROUND ART

There are many induction modes for a touch screen, such as optical, microwave, resistance, capacitance induction modes, wherein the capacitance induction mode is most widely used. The capacitance induction mode includes a self-capacitance induction mode and a mutual capacitance induction mode. Compared to the self-capacitance induction mode, the mutual capacitance induction mode has advantages of strong anti-interference ability, high sensitivity, realizing multi-touch ability and good recognition ability etc., thus the mutual capacitance induction mode has become the mainstream induction mode of a touch screen now.

Currently, there are two types of touch screen of the mutual capacitance induction mode: In-Cell touch screen and On-Cell touch screen. In an In-Cell touch screen, a touch induction electrode and a touch drive electrode are provided inside a display panel. In order to achieve compactness, at present, a design of sharing a certain signal electrode between display and touch is used in the In-Cell touch screen, for example, a common electrode used for displaying is also used as a touch drive electrode for touching. However, in an On-Cell touch screen, a touch induction electrode and a touch drive electrode are provided outside or on an outer surface of a display panel. As the electrode used for displaying and the electrode used for touching are provided and controlled separately, the On-Cell touch screen has an advantage of no mutual interference between display and touch. However, by contrast, for the In-Cell touch screen, as a certain signal electrode is shared and time-division multiplexed, there is no need for additional procedures to prepare the touch screen, and the aperture ratio and transmittance of display pixels are almost not affected. Thus, the In-Cell touch screen has great application prospect.

As shown in FIGS. 1 and 2, a touch screen of the mutual capacitance induction mode in the prior art comprises a touch substrate comprising an insulation layer, a common electrode layer, and a common electrode signal line 1 and a plurality of touch drive electrode signal lines 2 provided in the same layer, wherein, the insulation layer is provided between the common electrode layer and the common electrode signal line 1 and the touch drive electrode signal lines 2. The common electrode layer comprises a plurality of common electrodes 300, a plurality of touch drive electrodes (touch drive sub-electrodes 200 in each column in FIGS. 1 and 2 constitute one touch drive electrode) which are multiplexed, and a common electrode connection strip 100 for connecting the common electrodes 300, wherein, the common electrodes 300 and the touch drive electrodes are intersected and insulated with each other, each of the touch drive electrodes comprises a plurality of touch drive sub-electrodes 200, the common electrode connection strip 100 is connected with the common electrode signal line 1 through a plurality of first via-holes 101 penetrating through the insulation layer (as shown in FIG. 1), or a plurality of third via-holes 301 are provided at positions of the insulation layer corresponding to positions of the common electrodes 300, the third via-holes 301 are used for connecting the common electrodes 300 and the common electrode signal line 1 (as shown in FIG. 2), each of the touch drive sub-electrodes 200 is connected with one of the touch drive electrode signal lines 2 through a second via-hole 201 penetrating through the insulation layer, the touch drive sub-electrodes 200 of different touch drive electrodes are connected with different touch drive electrode signal lines 2.

The inventor found that there are at least following problems in the prior art: in order to avoid a problem of delay, a plurality of via-holes are formed in the insulation layer corresponding to the common electrode connection strip 100 or the common electrode connection strip 100 and the common electrodes 300 for connecting the common electrodes 300 and the common electrode signal line 1. The objective of forming the plurality of via-holes is to reduce resistances of the common electrodes, but each of the touch drive sub-electrodes 200 is connected with the touch drive electrode signal line 2 only through one second via-hole 201 in the insulation layer corresponding thereto, thus, for a whole touch substrate, the distribution of the via-holes are great non-uniform, thereby the abilities of the common electrode signal line 1 and the touch drive electrode signal lines 2 to reflect light are inconsistent, and under influence of an electric field, display of pictures on the touch screen is not uniform.

SUMMARY

In view of above problems existing in a touch screen of the mutual capacitance induction mode in the prior art, an objective of the present invention is to provide a touch substrate and a display device which can avoid non-uniform display on a touch screen due to non-uniform distribution of via-holes in the touch substrate.

One technical solution of the present invention is a touch substrate comprising: a base; an insulation layer, a common electrode layer, and a common electrode signal line and a plurality of touch drive electrode signal lines in the same layer provided on the base, wherein, the insulation layer is provided between the common electrode layer and the common electrode signal line and the touch drive electrode signal lines, the common electrode layer comprises a plurality of touch drive electrodes, a plurality of common electrodes and a common electrode connection strip for connecting the common electrodes, the touch drive electrodes and the common electrodes are intersected and insulated with each other, each of the touch drive electrodes comprises a plurality of touch drive sub-electrodes, the common electrode connection strip is connected with the common electrode signal line through a plurality of first via-holes penetrating through the insulation layer, each of the touch drive sub-electrodes is connected with one of the touch drive electrode signal lines through a second via-hole penetrating through the insulation layer, the touch drive sub-electrodes of different touch drive electrodes are connected with different touch drive electrode signal lines, and wherein, semi-holes incompletely penetrating through the insulation layer are provided at positions of the insulation layer corresponding to positions of the common electrodes and/or the touch drive sub-electrodes.

In the present invention, as the semi-holes incompletely penetrating through the insulation layer are provided at positions of the insulation layer corresponding to positions of the common electrodes and/or the touch drive sub-electrodes, the distribution of holes (all of first via-holes, second via-holes, and semi-holes are called as "holes") in the insulation layer over the whole touch substrate may be harmonious, thereby the technical problem that the abilities of the common electrode signal line and the touch drive electrode signal lines to reflect light are inconsistent due to non-uniform distribution of the holes can be solved, so that under influence of an electric field, display of pictures on a display device comprising the touch substrate will be uniform.

The insulation layer may comprise a first insulation layer and a gate insulation layer, and the touch substrate may further comprise: a gate provided in the same layer as the common electrode signal line and the touch drive electrode signal lines, the gate insulation layer is provided above the gate; an active area provided above the gate insulation layer; a source and a drain provided above the active area and connected with the active area, the first insulation layer is provided above the source and the drain, and the common electrode layer is provided above the first insulation layer.

The semi-holes may penetrate through the first insulation layer.

Alternatively, the semi-holes may penetrate through the first insulation layer and incompletely penetrate through the gate insulation layer.

Alternatively, the insulation layer may comprise a first insulation layer, the common electrode layer is provided on the base, the first insulation layer covers the common electrode layer, and the common electrode signal line and the touch drive electrode signal lines are provided in the same layer and above the first insulation layer, wherein the semi-holes incompletely penetrate through the first insulation layer.

A plurality of second via-holes may be provided at position of the insulation layer corresponding to position of each of the touch drive sub-electrodes.

The second via-hole and the semi-holes corresponding to each of the touch drive sub-electrodes may be arranged as a lattice.

A plurality of third via-holes may be provided at position of the insulation layer corresponding to position of each of the common electrodes, and the common electrode signal line is connected with the common electrodes through the third via-holes.

The third via-holes and the semi-holes corresponding to each of the common electrodes may be arranged as a lattice.

The touch substrate may further comprise touch induction electrodes, and the touch induction electrodes and the touch drive electrodes are intersected and insulated with each other.

The touch substrate may comprise a display region and a periphery region, and each of the touch drive electrode signal lines may comprise a plurality of touch drive electrode leads and a touch drive electrode control line, each of the touch drive electrode leads is connected with one of the touch drive sub-electrodes in one of the touch drive electrodes through one second via-hole, the touch drive electrode leads are connected with the touch drive electrode control line, wherein, the touch drive electrode control line is provided in the periphery region, and the touch drive electrode leads are provided in the display region.

The touch substrate may comprise a display region and a periphery region, and the common electrode signal line may comprise a plurality of common electrode leads and a common electrode control line, the common electrode leads are connected with the common electrode control line, wherein, each of the common electrode leads is connected with the common electrode connection strip through one of the first via-holes, and wherein, the common electrode control line is provided in the periphery region, and the common electrode leads are provided in the display region.

The touch substrate may comprise a display region and a periphery region, and the common electrode signal line may comprise a plurality of common electrode leads and a common electrode control line, the common electrode leads are connected with the common electrode control line, wherein, each of the common electrode leads is connected with the common electrode connection strip through one of the first via-holes, and/or, each of the common electrode leads is connected with one of the common electrodes through one of the third via-holes, wherein, the common electrode control line is provided in the periphery region, and the common electrode leads are provided in the display region.

Another technical solution of the present invention is a display device comprising above touch substrate.

As the display device of the present invention comprises above touch substrate, the display effect thereof is better.

DETAILED DESCRIPTION OF THE PREFERRED EMBODIMENTS

Hereafter, in order to make a person skilled in the art understand technical solutions of the present invention better, the present invention will be described in detail in conjunction with the accompanying drawings and specific embodiments.

Embodiment 1

Figure 1:
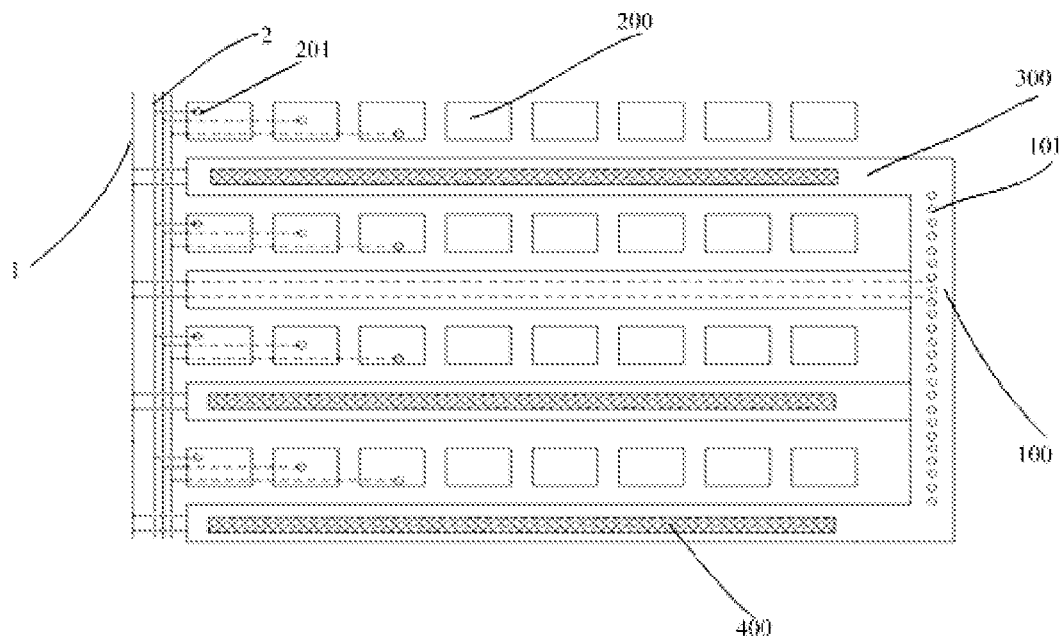
FIG. 1 is a structure diagram of a mutual capacitance touch screen in the prior art.
Figure 2:
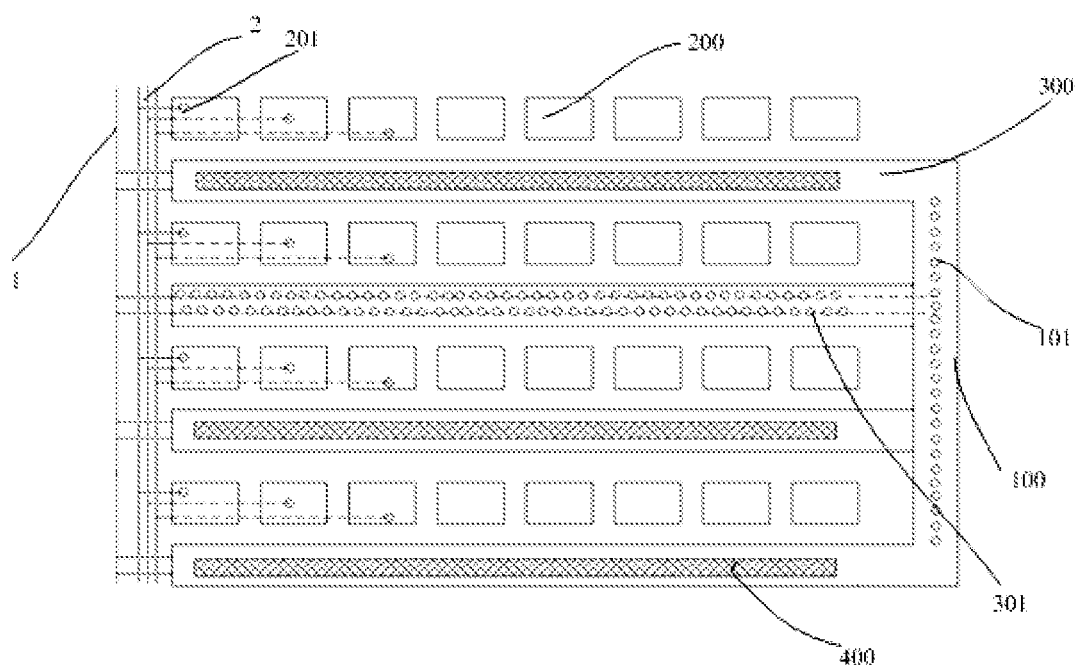
FIG. 2 is another structure diagram of a mutual capacitance touch screen in the prior art.
Figure 3:
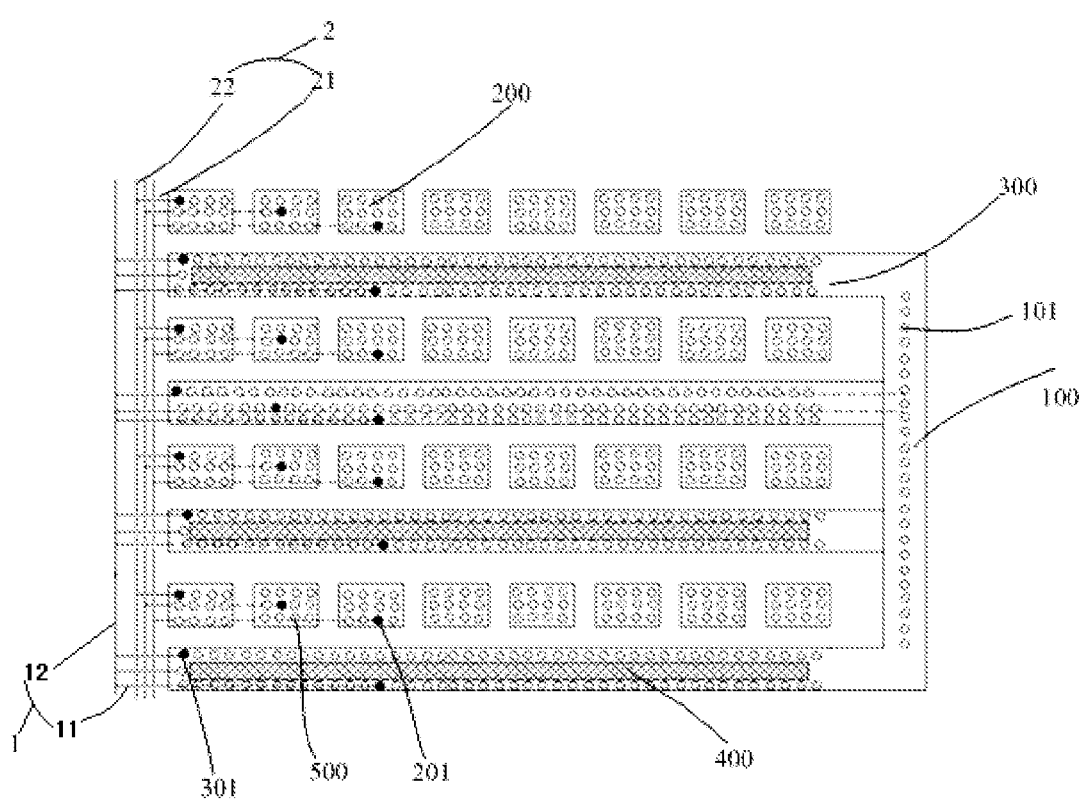
FIG. 3 is a structure diagram of a touch substrate according to Embodiment 1 of the present invention.
Figure 4:
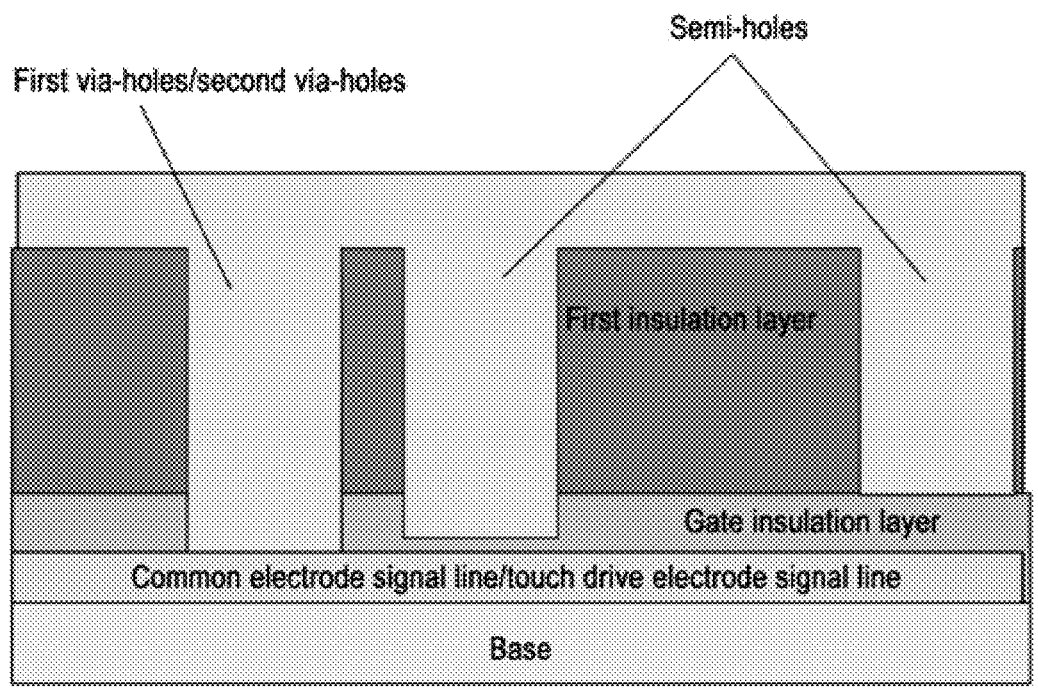
FIG. 4 is a cross-sectional diagram according to Embodiment 1 of the present invention.

As shown in FIG. 3, the present embodiment provides a touch substrate comprising: a base; an insulation layer, a common electrode layer, and a common electrode signal line 1 and a plurality of touch drive electrode signal lines 2 in the same layer provided on the base, wherein, the insulation layer is provided between the common electrode layer and common electrode signal line 1 and the touch drive electrode signal lines 2, the common electrode layer comprises a plurality of touch drive electrodes, a plurality of common electrodes 300, and a common electrode connection strip 100 for connecting the common electrodes 300, the touch drive electrodes and the common electrodes 300 are intersected and insulated with each other, each of the touch drive electrodes comprises a plurality of touch drive sub-electrodes 200 (the touch drive sub-electrodes 200 in each column in FIG. 3 constitute one touch drive electrode), the common electrode connection strip 100 is connected with the common electrode signal line 1 through a plurality of first via-holes 101 penetrating through the insulation layer, each of the touch drive sub-electrodes 200 is connected with one of the touch drive electrode signal lines 2 through a second via-hole 201 penetrating through the insulation layer, the touch drive sub-electrodes 200 of different touch drive electrodes are connected with different touch drive electrode signal lines. In addition, in the present embodiment, semi-holes 500 incompletely penetrating through the insulation layer are provided at positions of the insulation layer corresponding to positions of the common electrodes 300 and/or the touch drive sub-electrodes 200.

It should be noted that, the semi-holes 500 are holes incompletely penetrating through the insulation layer, that is, in the present embodiment, all of the holes incompletely penetrating through the insulation layer are called as semi-holes 500. It should be understood that, although the semi-holes 500 do not penetrate through the insulation layer, the thickness of the insulation layer at positions of the semi-holes 500 has been reduced, thus the common electrode signal line 1 and the touch drive electrode signal lines 2 can reflect light at these positions.

In the present embodiment, as the semi-holes 500 incompletely penetrating through the insulation layer are provided at positions of the insulation layer corresponding to positions of the common electrodes 300 and/or the touch drive sub-electrodes 200, the distribution of holes (all of first via-holes 101, second via-holes 201, and semi-holes 500 are called as "holes") in the insulation layer over the whole touch substrate may be harmonious, thereby the technical problem that the abilities of the common electrode signal line 1 and the touch drive electrode signal lines 2 to reflect light are inconsistent due to non-uniform distribution of the holes can be solved, so that under influence of an electric field, display of pictures on a display device comprising the touch substrate will be uniform.

As a specific implementation of the present embodiment, preferably, the insulation layer comprises a first insulation layer and a gate insulation layer, and the touch substrate may specifically comprise: a base; a gate, a gate signal line, a common electrode signal line 1, touch drive electrode signal lines 2 provided on the base (the gate, the gate signal line, the common electrode signal line 1 and the touch drive electrode signal lines 2 are provided in the same layer and all of them are made of a gate metal material); a gate insulation layer provided above the gate, the gate signal line, the common electrode signal line 1 and the touch drive electrode signal lines 2; an active area provided above the gate insulation layer; a source and a drain connected with the active area and provided above the active area; a first insulation layer provided above the source and the drain; a common electrode layer provided above the first insulation layer, wherein, the common electrodes 300 are connected with the common electrode signal line 1 through the first via-holes 101 penetrating through the first insulation layer and the gate insulation layer, the touch drive sub-electrode 200 is connected with the touch drive electrode signal line 2 through the second via-hole 201 penetrating through the first insulation layer and the gate insulation layer.

Further preferably, the semi-holes 500 incompletely penetrate through the insulation layer in two manners: first, the semi-holes 500 only penetrate through the first insulation layer, which can be easily and conveniently realized by controlling dosage of liquid for etching the first insulating layer; second, the semi-holes 500 penetrate through the first insulation layer and incompletely penetrate through the gate insulation layer, which can make the semi-holes 500 be as similar to the first via-holes 101 and the second via-hole 201 as possible, and the problem that the abilities of the common electrode signal line 1 and the touch drive electrode signal lines 2 to reflect light are inconsistent due to the non-uniform distribution of the holes can be avoided, thereby under influence of an electric field, display of pictures on a display device comprising the touch substrate is uniform As another specific implementation of the present embodiment, preferably, the insulation layer comprises a first insulation layer, the common electrode layer is provided on the base, the first insulation layer covers the common electrode layer, and the common electrode signal line 1 and the touch drive electrode signal lines 2 are provided in the same layer and above the first insulation layer, wherein, the semi-holes 500 incompletely penetrate through the first insulation layer. This implementation is similar to above implementation except that, in this implementation, the common electrode layer is provided on the base, and the common electrode layer is separated from the common electrode signal line 1 and the touch drive electrode signal lines 2 by the first insulation layer, in this case, only semi-holes 500 incompletely penetrating through the first insulation layer should be formed, and the principle is similar to above, which will not be repeatedly described here.

In the present embodiment, preferably, a plurality of second via-holes 201 are provided at position of the insulation layer corresponding to position of each of the touch drive sub-electrodes 200, as long as the touch drive sub-electrodes 200 not within the same touch drive electrode are not shorted. In this case, the distribution of the holes can be ensured to be as uniform as possible, and the problem that the abilities of the touch drive electrode signal lines 2 to reflect light are inconsistent is avoided.

In order to realize a uniform distribution of the holes, the second via-hole 201 and the semi-holes 500 corresponding to each of the touch drive sub-electrodes 200 are arranged as a lattice.

In the present embodiment, in order to realize a further uniform distribution of the holes, preferably, a plurality of third via-holes 301 are provided at position of the insulation layer corresponding to position of each of the common electrodes 300, the common electrode signal line 1 is further connected with the common electrodes 300 through the third via-holes 301. In this case, the problem that the distribution of the holes is not uniform can be relieved, while connections between the common electrode signal line 1 and the common electrodes 300 are increased, thereby RC delay of the touch substrate may be reduced. Further preferably, the third via-holes 301 and the semi-holes 500 corresponding to each of the common electrodes 300 are arranged as a lattice.

Further, in order to make the wiring uniform, preferably, in the present embodiment, the second via-holes 201 and the third via-holes 301 are distributed uniformly.

In addition, preferably, in the present embodiment, the touch substrate further comprises touch induction electrodes 400, and the touch induction electrodes 400 and the touch drive electrodes (the touch drive sub-electrodes 200 in each column in FIG. 3 constitute one touch drive electrode) are intersected and insulated with each other. Of course, the touch induction electrodes may not be provided in the touch substrate, for example, they may be provided in a substrate to be aligned with the touch substrate to form a cell.

Further preferably, the touch substrate comprises a display region and a periphery region, and each of the touch drive electrode signal lines 2 comprises a plurality of touch drive electrode leads 21 and a touch drive electrode control line 22, each of the touch drive electrode leads 21 is connected with one of the touch drive sub-electrodes 200 in one of the touch drive electrodes through one second via-hole 201, the touch drive electrode leads 21 are connected with the touch drive electrode control line 22, wherein, the touch drive electrode control line 22 is provided in the periphery region, and the touch drive electrode leads 21 are provided in the display region. In this case, the RC delay caused by the capacitance which is formed due to the overlap of the touch drive electrodes and the touch drive signal lines can be avoided.

Further preferably, the touch substrate comprises a display region and a periphery region, and the common electrode signal line 1 comprises a plurality of common electrode leads 11 and a common electrode control line 12, the common electrode leads 11 are connected with the common electrode control line 12, wherein, each of the common electrode leads 11 is connected with the common electrode connection strip 100 through one of the first via-holes 101, and/or, each of the common electrode leads 11 is connected with one of the common electrodes 300 through one of the third via-holes 301, wherein, the common electrode control line 12 is provided in the periphery region, and the common electrode leads 11 are provided in the display region. In this case, the RC delay caused by the capacitance which is formed due to the overlap of the common electrodes and the common electrode signal line can be avoided.

Further preferably, the touch drive electrode leads 21 and the common electrode leads 11 are distributed uniformly.

Embodiment 2

The present embodiment provides a display device comprising the touch substrate in Embodiment 1. The display device may be a phone, a Tablet PC, a television, a display, a notebook PC, a digital photo frame, a navigator, and any other products or members with display function.

As the display device of the present embodiment comprises the touch substrate in Embodiment 1, the display effect thereof is better.

Of course, the display device of the present embodiment may comprise other conventional structures such as a power supply, a display drive unit.

It should be appreciated that, the foregoing embodiments are exemplary embodiments merely for describing the principle of the present invention, but the present invention is not limited thereto. A person skill in the art may make various modifications and improvements without departing from the spirit and essence of the present invention, and these modifications and improvements shall fall into the protection scope of the present invention.

The invention claimed is:

1. A touch substrate, comprising: a base; an insulation layer, a common electrode layer, and a common electrode signal line and a plurality of touch drive electrode signal lines in the same layer provided on the base, wherein,
the insulation layer is provided between the common electrode layer and the common electrode signal line and the touch drive electrode signal lines,
the common electrode layer comprises a plurality of touch drive electrodes, a plurality of common electrodes and a common electrode connection strip for connecting the common electrodes, the touch drive electrodes and the common electrodes are intersected and insulated with each other, each of the touch drive electrodes comprises a plurality of touch drive sub-electrodes, the common electrode connection strip is connected with the common electrode signal line through a plurality of first via-holes penetrating through the insulation layer, each of the touch drive sub-electrodes is connected with one of the touch drive electrode signal lines through a second via-hole penetrating through the insulation layer, the touch drive sub-electrodes of different touch drive electrodes are connected with different touch drive electrode signal lines,
characterized in that,
semi-holes partially penetrating through the insulation layer are provided at positions of the insulation layer corresponding to positions of the common electrodes and/or the touch drive sub-electrodes;
the insulation layer comprises a first insulation layer and a gate insulation layer, and the touch substrate further comprises: a gate provided in the same layer as the common electrode signal line and the touch drive electrode signal lines, the gate insulation layer is provided above the gate; an active area provided above the gate insulation layer; a source and a drain provided above the active area and connected with the active area, the first insulation layer is provided above the source and the drain, and the common electrode layer is provided above the first insulation layer; and
the semi-holes penetrate through the first insulation layer and partially penetrate through the gate insulation layer.

2. A touch substrate, comprising: a base, an insulation layer, a common electrode layer, and a common electrode signal line and a plurality of touch drive electrode signal lines in the same layer provided on the base, wherein,
the insulation layer is provided between the common electrode layer and the common electrode signal line and the touch drive electrode signal lines,
the common electrode layer comprises a plurality of touch drive electrodes, a plurality of common electrodes and a common electrode connection strip for connecting the common electrodes, the touch drive electrodes and the common electrodes are intersected and insulated with each other, each of the touch drive electrodes comprises a plurality of touch drive sub-electrodes, the common electrode connection strip is connected with the common electrode signal line through a plurality of first via-holes penetrating through the insulation layer, each of the touch drive sub-electrodes is connected with one of the touch drive electrode signal lines through a second via-hole penetrating through the insulation layer, the touch drive sub-electrodes of different touch drive electrodes are connected with different touch drive electrode signal lines,
characterized in that,
semi-holes partially penetrating through the insulation layer are provided at positions of the insulation layer corresponding to positions of the common electrodes and/or the touch drive sub-electrodes; and
the insulation layer comprises a first insulation layer, the common electrode layer is provided on the base, the first insulation layer covers the common electrode layer, and the common electrode signal line and the touch drive electrode signal lines are provided in the same layer and above the first insulation layer, wherein the semi-holes partially penetrate through the first insulation layer.

3. The touch substrate of claim 1, characterized in that, a plurality of second via-holes are provided at position of the insulation layer corresponding to position of each of the touch drive sub-electrodes.

4. The touch substrate of claim 1, characterized in that, the second via-hole and the semi-holes corresponding to each of the touch drive sub-electrodes are arranged as a lattice.

5. The touch substrate of claim 1, characterized in that, a plurality of third via-holes are provided at position of the insulation layer corresponding to position of each of the common electrodes, and the common electrode signal line is connected with the common electrodes through the third via-holes.

6. The touch substrate of claim 5, characterized in that, the third via-holes and the semi-holes corresponding to each of the common electrodes are arranged as a lattice.

7. The touch substrate of claim 1, characterized in that, the touch substrate further comprises touch induction electrodes, and the touch induction electrodes and the touch drive electrodes are intersected and insulated with each other.

8. The touch substrate of claim 1, characterized in that, the touch substrate comprises a display region and a periphery region, and each of the touch drive electrode signal lines comprises a plurality of touch drive electrode leads and a touch drive electrode control line, each of the touch drive electrode leads is connected with one of the touch drive sub-electrodes in one of the touch drive electrodes through one second via-hole, the touch drive electrode leads are connected with the touch drive electrode control line, wherein, the touch drive electrode control line is provided in the periphery region, and the touch drive electrode leads are provided in the display region.

9. The touch substrate of claim 1, characterized in that, the touch substrate comprises a display region and a periphery region, and the common electrode signal line comprises a plurality of common electrode leads and a common electrode control line, the common electrode leads are connected with the common electrode control line, wherein, each of the common electrode leads is connected with the common electrode connection strip through one of the first via-holes, and wherein, the common electrode control line is provided in the periphery region, and the common electrode leads are provided in the display region.

10. The touch substrate of claim 5, characterized in that, the touch substrate comprises a display region and a periphery region, and the common electrode signal line comprises a plurality of common electrode leads and a common electrode control line, the common electrode leads are connected with the common electrode control line, wherein, each of the common electrode leads is connected with the common electrode connection strip through one of the first via-holes, and/or, each of the common electrode leads is connected with one of the common electrodes through one of the third via-holes, wherein, the common electrode control line is provided in the periphery region, and the common electrode leads are provided in the display region.

11. A display device, comprising the touch substrate of claim 1.

12. The touch substrate of claim 2, characterized in that, a plurality of second via-holes are provided at position of the insulation layer corresponding to position of each of the touch drive sub-electrodes.

13. The touch substrate of claim 2, characterized in that, the second via-hole and the semi-holes corresponding to each of the touch drive sub-electrodes are arranged as a lattice.

14. The touch substrate of claim 2, characterized in that, a plurality of third via-holes are provided at position of the insulation layer corresponding to position of each of the common electrodes, and the common electrode signal line is connected with the common electrodes through the third via-holes.

15. The touch substrate of claim 14, characterized in that, the third via-holes and the semi-holes corresponding to each of the common electrodes are arranged as a lattice.

16. The touch substrate of claim 2, characterized in that, the touch substrate further comprises touch induction electrodes, and the touch induction electrodes and the touch drive electrodes are intersected and insulated with each other.

17. The touch substrate of claim 2, characterized in that, the touch substrate comprises a display region and a periphery region, and each of the touch drive electrode signal lines comprises a plurality of touch drive electrode leads and a touch drive electrode control line, each of the touch drive electrode leads is connected with one of the touch drive sub-electrodes in one of the touch drive electrodes through one second via-hole, the touch drive electrode leads are connected with the touch drive electrode control line, wherein, the touch drive electrode control line is provided in the periphery region, and the touch drive electrode leads are provided in the display region.

18. The touch substrate of claim 2, characterized in that, the touch substrate comprises a display region and a periphery region, and the common electrode signal line comprises a plurality of common electrode leads and a common electrode control line, the common electrode leads are connected with the common electrode control line, wherein, each of the common electrode leads is connected with the common electrode connection strip through one of the first via-holes, and wherein, the common electrode control line is provided in the periphery region, and the common electrode leads are provided in the display region.

19. The touch substrate of claim 14, characterized in that, the touch substrate comprises a display region and a periphery region, and the common electrode signal line comprises a plurality of common electrode leads and a common electrode control line, the common electrode leads are connected with the common electrode control line, wherein, each of the common electrode leads is connected with the common electrode connection strip through one of the first via-holes, and/or, each of the common electrode leads is connected with one of the common electrodes through one of the third via-holes, wherein, the common electrode control line is provided in the periphery region, and the common electrode leads are provided in the display region.

20. A display device, comprising the touch substrate of claim 2.

* * * * *